United States Patent Office 3,215,585
Patented Nov. 2, 1965

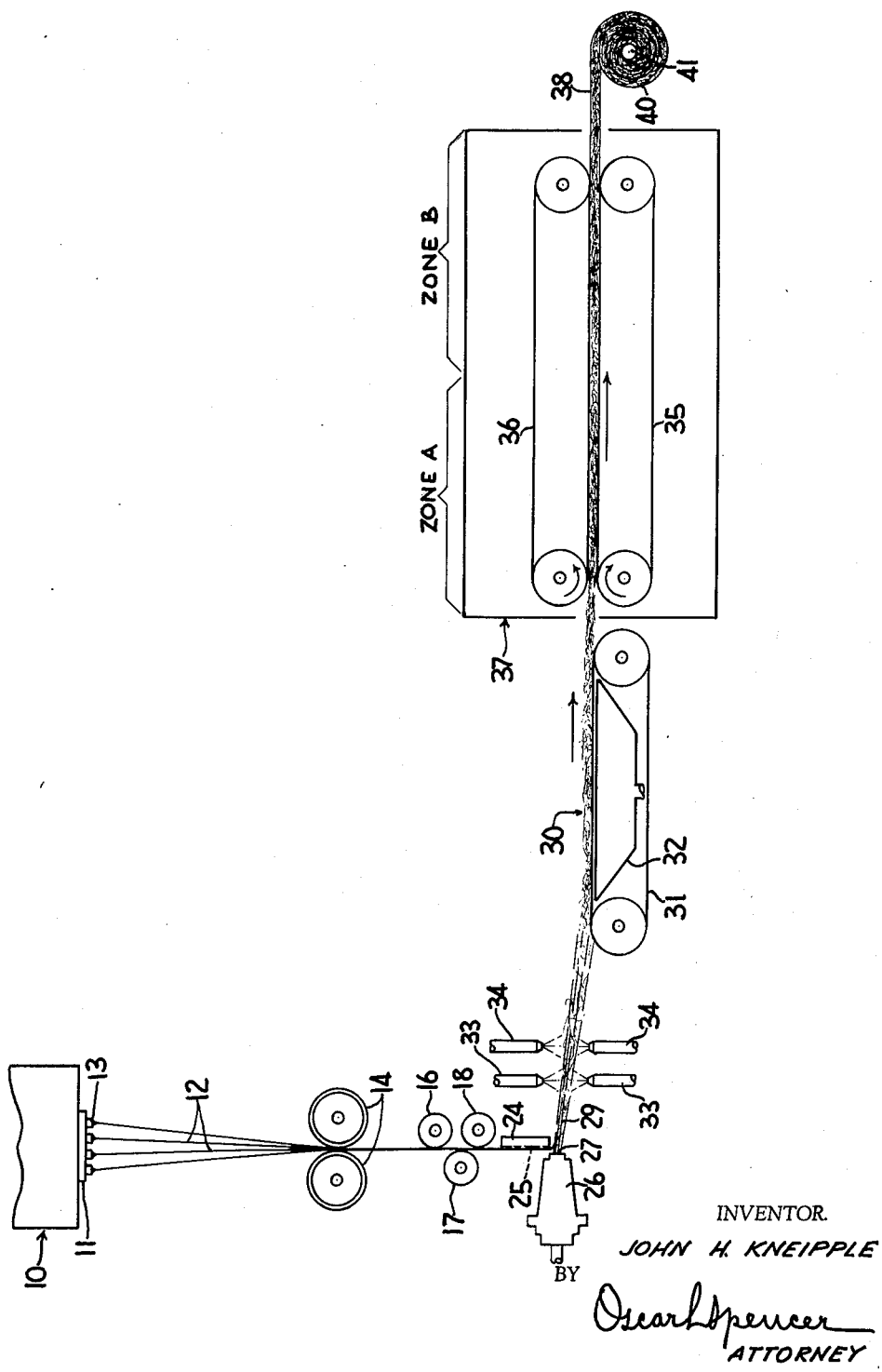

3,215,585
COMPOSITE GLASS FIBER PRODUCTS AND
PROCESS OF PREPARING THE SAME
John H. Kneipple, Shelbyville, Ind., assignor to Pittsburgh Plate Glass Company, Pittsburgh, Pa., a corporation of Pennsylvania
Filed Dec. 28, 1962, Ser. No. 248,052
15 Claims. (Cl. 161—170)

This invention relates to composite glass fiber articles containing significant amounts of a thermo-setting resinous composition prepared by initially reacting phenol and formaldehyde to the "A" or "B" stage of condensation, and then adding crystalline urea, either in solid or liquid form, followed by addition thereto of a curing agent, such as hexamethylene tetramine, to harden the above-mentioned composite resinous composition.

The articles produced according to the present invention contain glass fibers and the aforementioned synthetic resin thermo-setting binder. These articles range in density from one-eighth pound per cubic foot to about 20 pounds per cubic foot, with the lower density products having utility for insulation purposes and the like and the high density products having utility as structural boards and the like.

It is an object of this invention to provide composite glass fiber, resinous articles characterized by a binder composition having outstanding resistance to punking and combustion while coupled with excellent moisture resistance when the binder composition is advanced to its cured state.

A further object of the present invention is the preparation of glass fiber-resin composite insulation articles which are economical in nature, and wherein the binder component thereof is less expensive than the glass fibers themselves.

Another object of the present invention is the preparation of glass fiber-resin composite articles having highly desirable cutting and shaping characteristics, and which can be machined and readily hand-cut with portable cutting devices, such as hand knives and saws, for easy installation of structural board and insulation materials on the job site. These good cutting and shaping properties are essential for certain military uses, e.g., the use as "Navy Hull Board" where the composite structural boards of the present invention must be able to be cut using readily available tools, and shaped to fit into complex contours aboard ship.

Other objects and advantages of the present invention will appear hereinbelow from the following description.

The invention will be more fully understood by reference to the following detailed description and accompanying schematic drawings wherein a single figure illustrates a preferred embodiment of the present invention.

Referring to the drawing there is shown at 10 a pot of molten glass from which primary fibers 12 are attenuated from bushing 11 through orifices 13 by drawing rolls 14 which can be driven by any suitable means. These fibers pass between guide rolls 16, 17 and 18 and over the grooved surface 25 of guide plate 24. At the lower end of plate 24, the fibers feed into a high speed gaseous blast 29 issuing directly from the discharge slot 27 of a high velocity gas burner 26 onto the ends of the primary fibers 12. The blast is so intensely hot that as the fibers move into the blast they are melted and the molten glass is drawn out by the force of the blast into fine glass fibers.

The fibers attenuated and blown by the gaseous blast are collected at 30 on a foraminous moving belt 31 with the assistance of a vacuum system, a portion of which is indicated at 32. The illustrated collective equipment and the power means therefor are conventional and accordingly are not set forth in detail in the schematic illustration.

Before the fibers are collected and moved laterally in the direction indicated by the arrows, they are sprayed first with water from spray heads 33 and then with the phenol formaldehyde-crystalline urea aqueous binder solution of the present invention from spray heads 34. The phenol-formaldehyde urea binder employed in this invention exhibits tacky properties which yield enhanced adhesion of the binder to glass fibers. Moreover, the viscosity of the binder is sufficiently high at the time it is applied to the glass fibers to aid in preventing the binder from being drawn off along with the water when the suction is applied, e.g., by vacuum system 32. The water spray from spray heads 33 helps in localizing the fiber feed and compacting them on forming belt 31. The resinout composition of the present invention is preferably applied from an aqueous system (viz., an aqueous solution or dispersion. However, other solvent systems can be used, e.g., an ethyl alcohol organic solvent or any organic solvent which is soluble in or readily miscible with water. An aqueous solvent system is preferred.

The water can be readily dried from the fibers in the course of their travel along the conveyor system. Some water is removed by the suction means. Most of the water is removed by evaporation due to heat produced by the gas burner 26. Of course, other heating devices, e.g., radiant heat lamps can also be used for this purpose. The fine fibers are conveyed from collecting belt 31 onto lower foraminous belt 35 which coacts with upper foraminous belt 36 to compress the resin-impregnated fibers to any desired degree. The fibers are carried between belts 35 and 36 through drying and curing oven 37, which has a lower temperature Zone A and a higher temperature Zone B. Both belt 35 and 36 can be set to define the thickness of the resin bonded glass fiber insulation material passing therebetween. This is done by conventional means (not shown) such as spring biasing the rollers upon which the conveyor belts are mounted by biasing springs against the central shaft mountings of the conveyor driving rollers.

The web or board 38 of glass fibers, coated and impregnated with the resinous composition containing the polymeric network of phenol-formaldehyde condensate and crystalline urea advanced to a cured state can be passed from the conveyor system to form a reel 40 comprising the glass fiber web 38 wound around a centrally located shaft 41. If the resin impregnated continuous glass fiber mat is to be used to make a relatively high density insulation product and exists in "board" form as it passes from the conveyor system, the glass fiber board instead of being wound up on a reel can be passed immediately to suitable cutting devices (not shown). Also, prior to or following the cutting thereof the glass fiber insulation board can be laminated to a base sheet, such as a heat resistant sheet or fabric which can serve as an ultimate facing sheet therefor when the insulation board is installed in place.

The fine, attenuated glass fibers can be formed using horizontal gaseous blast technique such as indicated and shown in U.S. Patent No. 2,489,243, or can be formed by the flame centrifugal and steam centrifugal processes as indicated in U.S. Reissue Patent No. 24,708 and U.S. Patent No. 2,949,632, respectively.

It will be manifest that the thickness of the fibrous layer will depend chiefly upon the rate of feed of molten glass, the number of orifices in the fiber forming system, the rate of linear travel of the normally endless collecting belt conveyor system and the height between vertically adjustable conveyor belts 35 and 36.

In the past, phenol-formaldehyde resins have constituted the principal binding agent for glass fibers. Phenol-formaldehyde binder materials are usually applied either in an unpolymerized, or initially polymerized, viz., "A" stage, or intermediate stage, viz., "B" stage, of polymerization. They are subsequently advanced to a cured stage upon activation by heat and/or catalyst with or without the application of pressure for densification of the composite mass into a board or molded form.

The phenol-formaldehyde reaction is exothermic, that is, heat is given off by the reaction of phenol and formaldehyde to the resinous stage of polymerization. It is conceivable, then, that the exotherimc reaction will continue in the vicinity of an accidentally included hot spot in the glass fibers (viz., an accidentally included molten gob of glass) to a point far beyond that which is contemplated in the manufacturing process. In view of the fact that the surrounding glass fibers constitute excellent heat insulation, the heat of the gob and the heat given off by the reaction will become cumulative within a confined area until such temperatures are obtained as will cause thermal decomposition of the organic resin, thus forming various decomposition products, including vapors which may have an ignition temperature corresponding to the temperature of the surrounding medium. When this condition is reached, the vapors will burst into flame and conflagration will spread to the surrounding area. The quiescent stage before actual ignition is hereinafter referred to as "punking." It may last for a considerable length of time with the result that the ignition of the entire shipment or load may occur in a warehouse; or in the case of "Navy Hull Board" on board ship; or in the case of pipe and other like density insulation, it may occur in the home or factory.

In an attempt to eliminate these dangerous and costly mishaps, adhesives have been formulated in which urea formaldehyde resins replace all or the greater portion of the phenol formaldehyde resins. In certain phases improvement has been secured, but binder compositions based on urea formaldehyde resin have many of the same and additional objectionable characteristics. For example, they do not have adequate moisture resistance for all insulation uses of the bonded glass fiber materials, especially when the bonded insulation is to be of high density and subjected to corrosive salt water atmospheric conditions and spray, e.g., as in "Navy Hull Board." Moreover, because of the comparatively uncontrollable rapid curing characteristics of the urea formaldehyde resin, it is difficult to make use of the resinous material as a binding agent and at the same time secure uniform distribution thereof in the glass fiber mat.

Moreover, it is customary in preparing prior art glass fiber resin-impregnated insulation materials to minimize the amount of resinous binder which is employed to thereby secure economic savings. In most prior art resin-impregnated glass fiber mats, the resinous binder costs more than the glass fibers themselves. However, the use of minimal concentrations of binder results in reduced mechanical properties whereas in general the use of higher concentrations of binder results in better mechanical properties.

However, according to the present invention, the weight concentration of binder can be as high as 40 percent of the total weight of binder and fibers and in some cases even higher. This is the case because the binder composition employed according to the present invention is generally less expensive than the prior art binder compositions due to the ability to include significant amounts of urea, which is less expensive than phenol-formaldehyde resin. Therefore, this serves as a double benefit from the use of applicant's invention, viz., (1) the ability to secure advantageous mechanical properties in the resin-bonded glass fiber mats and boards as well as (2) substantial economic savings due to the relatively inexpensive nature of applicant's binder composition.

In accordance with this invention, there is provided a bonded glass fiber product and method for production thereof wherein the binder comprises in its solid (non-aqueous) content: 70 to 100 percent by weight of total polymer component and 0 to 30 percent by weight of adjuvant materials along with sufficient pH control agent, e.g., ammonium hydroxide, to maintain a pH ranging from 7 to about 11 and preferably 7 to about 9. The total polymer component is comprised of 1 to 50 percent by weight of crystalline urea in solid or liquid form, and 50 to 99 percent by weight of phenol-formaldehyde of an "A" or "B" stage of condensation. The adjuvant materials, when included, are from 0 to about 10 percent by weight of a catalyst material(s); from 0 to about 10 percent by weight of a lubricant material; and from 0 to about 10 percent by weight of a silane coupling agent. Of course, other adjuvant materials, e.g., pigments, dyes, coloring agents, etc., can also be included.

While these adjuvant materials can be omitted, it is usually preferable to include them in the binder.

The remainder of the binder composition (aqueous content) comprises water with the weight ratio of the solids (non-aqueous) content to the water ranging from about 0.083 to 4.2:7.

The weight percentage of the non-aqueous components to the total weight of the binder formulation can range from about 1 to about 50 weight percent with the preferable range of solid non-aqueous components being from 2 to about 30 percent. Most preferably the non-aqueous components constitute about 8 to 25 percent by weight of the total aqueous binder composition.

In accordance with the present invention, it is now possible to produce resin-bonded glass fiber insulation boards and mats having marked resistance to burning and punking while at the same time possessing good moisture resistance and excellent cutting properties.

As used herein, the term "glass fibers" is intended to include glass fibers of the type produced by the attenuation of molten streams of glass by blasts of high pressure steam or air directed angularly downwardly or perpendicularly onto the molten streams as they issue from a glass melting device, such as pot 10 shown in the drawings. A more detailed showing of the production of such continuation glass fibers is shown and described in Slayter et al. Patent No. 2,206,058, or in the Simison et al. Patent No. 2,189,840. Preferably, use is made of "Superfine" glass fibers which are formed by gaseous burner blast blown systems such as shown in the accompanying drawing. In addition to the "Superfine" fibers, which are sometimes referred to as "glass fiber wool," glass fibers capable of use in practice of this invention can be prepared from continuous glass fibers cut or chopped to shorter lengths; or use can be made of continuous glass fibers and yarns of endless lengths which are deposited in swirl patterns or in haphazard fashion (random array) and the like. Such continuous fibers may be used alone or in combination with the "glass fiber wool" or staple type glass fibers in the formation of mats and boards for use with thermosetting binders in the manufacture of insulation products.

The phenol formaldehyde "A" or "B" stage condensates employed to form the binder composition employed in the present invention are represented by the conventional phenol formaldehyde "A" and "B" stage condensation products used in the manufacture of bonded insulation products or molded products. Use can be made of a phenol formaldehyde condensate advanced to an "A" (water-soluble) stage; or use can be made of phenol formaldehyde condensates advanced to a "B" (water dispersible) stage; or the phenol formaldehyde condensation product can be a mixture of an "A" stage and a "B" stage phenol formaldehyde condensate.

The phenol formaldehyde condensation product can be produced according to conventional condensation procedures using either one stage synthesis using a basic catalyst or a two stage synthesis using an alkaline catalyst. The ratio of formaldehyde to phenol can vary considerably, e.g., from 0.9 to 4.0 to 1. However, it is preferable to employ an excess of formaldehyde over and above stoichiometric molar amounts. Thus, for example, the formaldehyde to phenol molar reaction ratio can range from about 1.0 to 3.0:1.

Part of the phenol-formaldehyde condensate can be a phenol-formaldehyde condensate derived as a by-product from the destructive distillation of wood. From 0 to 50 percent and preferably 5 to 15 percent by weight of the phenol-formaldehyde condensate can be a wood distillation by-product phenol formaldehyde by-product with the remaining 50–100 percent by weight being a conventional phenol-formaldehyde condensate of the type described hereinabove.

The urea component is crystalline urea, which can be employed in solid form as granules or pellets or can be dissolved in water (liquid form) and added to the aqueous system containing the phenol-formaldehyde condensate.

The weight percentage of crystalline urea based on the total polymeric component of the binder usually ranges from about 5 to about 70 percent by weight of the total polymeric component. Conveniently the weight percent of urea in the polymeric component ranges from 25 to 50 percent by weight. Preferably, the weight percentage of crystalline urea ranges from about 30 to 45 percent of the total polymeric component of the binder. Usually at least 5 percent by weight of the total polymer content is crystalline urea.

An oleaginous lubricant and processing aid can be employed in the binder composition in order to lubricate the glass fibers as they are being formed into insulation boards or mats. A suitable lubricant material for use in accordance with the present invention is "Tybon Dark Oil," a product of Pacific Resins and Chemicals Inc. "Tybon Dark Oil" is a chemically modified, high-flash, water-soluble, high-viscosity mineral oil which is in emulsion form without requiring the use of additional dispersing agents or wetting agents, and has a solids content of approximately 45 percent by weight. "Tybon Dark Oil" has a weight per gallon of 8.0 pounds, a flash point (open cup) of 600° F. and a freeze-thaw resistance which is good after 10 cycles.

Another class of adjuvant materials which can be included in the binder are silane coupling agents. Especially preferred silane materials are those which not only function as a coupling agent but also serve as a lubricant and wetting agent. Amino-alkyl trialkoxy silanes constitute the preferred class of silane materials with gamma-aminopropyl triethoxy silane being the amino-alkyl trialkoxy silane of choice. Gamma-aminopropyl triethoxy silane is available under the trade names "A–1100" and "Silicone A–1100," and can be used either alone or in admixture with "Tybon Dark Oil" or other lubricants. The silane material can be employed in amounts ranging from 0 to about 10 percent by weight of the non-aqueous component. When a silane material is employed, the preferable weight concentration ranges from 0.5 to 5 percent by weight of the solid (non-aqueous) component of the binder.

Another adjuvant material which can be included in the binder is a catalyst(s), and the catalyst can constitute from 0 to about 10 percent by weight of the non-aqueous component of the binder. If time is not a significant factor in preparing the products, the catalyst(s) can be omitted and the urea, itself, will suffice as a curing agent. Usually, however, it is desirable to include a condensation (polymerization) catalyst to accelerate conversion of the phenol-formaldehyde "A" or "B" stage condensate to the "C" stage of polymerization. As suitable catalysts the following materials can be listed as exemplary of those which can be employed for this purpose in conjunction with this invention; ammonium chloride; ammonium sulfate; ammonium nitrate; ammonium bromide; ammonium iodide; ammonium fluoride; etc. Ammonium chloride and ammonium sulfate are the catalyst materials of choice.

In addition of the above-mentioned catalyst, an additional heat hardening (curing) catalyst, e.g., hexamethylene tetramine, can be employed to assist in heat setting the phenol-formaldehyde condensate to the water and solvent-insoluble stage. This curing catalyst can be initially dissolved in the aqueous binder, and applied along with the binder, e.g., by the spraying devices 34 as shown in the drawing; or it can be separately sprayed onto the glass fibers after the fibers have been impregnated with the binder and as they are being formed into a mat. Preferably, however, the thermosetting catalyst is included in the aqueous binder formulation and applied by spraying. In this manner it is possible to secure more uniform distribution of the curing agent in the glass fiber mat.

When catalyst(s) are included, the combined weight of catalyst material(s) ranges from 0.5 to 10 percent by weight of the non-aqueous component of the binder. Preferably the curing agent is employed in amounts ranging from 2 to about 4 percent by weight of the total polymeric component (phenol-formaldehyde condensate plus crystalline urea).

After the binder formulation is applied, the glass fiber mat containing the binder uniformly impregnated therein is subjected to a combined drying and curing operation by passing it between upper belt 36 and lower belt 35. Heat is supplied by any suitable heat sources such as gas burners via forced gas heat. One of the ancillary advantages of the present invention is that the drying of the binder and the curing thereof onto the glass fibers can be accomplished comparatively rapidly in one time-saving, simple operation. Of course, heat can be applied to the insulation mat from the bottom side also, and various combinations of both upper and lower heating schemes can be used. Generally the combined heating and curing operation will be conducted at temperatures ranging from about 300° F. to about 600° F. with the more preferable temperature range being from about 375° F. to 475 F. During the combined drying and curing operation, substantially all of the water is evaporated from the binder formulation leaving essentially a solid binder on the glass fibers. The time involved for curing will depend among other factors upon the specific type of apparatus employed to effect curing. For example, if a forced air heating system is used, the curing time will depend upon the volume and speed of the forced gas or air used for heating. Other factors include the thickness of the glass fiber mat and the resin content therein.

The glass fibers within the board or mat can be compressed to any desired density merely by regulating the distance between upper belt 36 and lower belt 35, and regulating the speed of movement of the fiber collecting belt 31. Instead of compressing the glass fibers between belts 36 and 35 and curing them immediately after the formation of the mat, the glass fiber mat can be loosely formed on belt 31 and then placed into a mold of any desired shape and cured during the molding operation to yield glass fiber insulation products having various shapes, contours, and configurations. For example, when making pipe insulation, it is convenient to first form a mat of a low density, and then place the resin-bonded mat into a mold, wherein the shaping and final curing of the phenol-formaldehyde-crystalline urea polymeric network takes place while the glass fibers are being compressed to the desired density during the molding operation. This curing in situ in the mold can be conducted rapidly while molding pipe insulation. For example, at a temperature of 475° F., a thickness of one inch, a density of 3.5 pounds per cubic foot, and a binder content of 12.5 percent by weight (based on the total weight of glass fibers and binder), a molded glass fiber pipe insulation product can be cured readily in a time period ranging from about 10 to about 25 seconds.

The weight percentage of binder formulation based on combined weight of glass fibers and binder in the dry, thermoset (cured) resin-bonded glass fiber products of the present invention can range from about 2 to about 40 percent with the preferred percentage of binder ranging from about 8 to about 35 percent by weight. The specific weight percentage of binder based on binder and glass fibers will depend on the ultimate use of the product. For low density products the preferred weight percentage of binder ranges from about 15 to 25 percent. For high density products the preferred weight percentage of binder ranges from about 25 to 35 percent. The term low density as used herein refers to products having densities of up to and including about 2.5 pounds per cubic foot whereas the term high density refers to products having densities above about 2.5 pounds per cubic foot.

While other polymeric materials can be used in combination with the phenol-formaldehyde condensate to constitute the total non-urea content of the total polymeric component, it is by far preferred both from a cost standpoint and as regards facility in processing that at least 50 percent of the non-urea content of the polymeric component of the binder be a phenol-formaldehyde condensate of the type described hereinabove. The benefits of the present invention are obtainable to the fullest extent when using at least 50 percent and preferably 50 to 100 percent by weight of said phenol-formaldehyde condensate(s) as the polymeric non-urea material in the binder.

The expression "non-urea content of the total polymeric component" as used herein is intended to designate that portion of the polymeric component which is not monomeric urea. With this designation in mind, there can be included in the non-urea polymeric portion of the binder minor amounts, e.g., from 1 to 20 percent by weight (based on the total non-urea polymeric component) of an "A" or "B" stage urea-formaldehyde condensate preferably in liquid form. For example, glass fiber pipe insulation and mat insulation products of both low and high densities have been produced within the purview of this invention by impregnating glass fibers with an aqueous binder composition varying in solids (non-aqueous) content from 8 to 20 percent and containing as a non-aqueous component: 20 percent by weight crystal urea; 64 percent by weight of an "A" stage phenol-formaldehyde condensate prepared by reacting a molar excess of formaldehyde with phenol; 10 percent by weight "Orzan-A"; 3 percent by weight of a water-soluble "A" stage liquid urea-formaldehyde condensate, prepared by reacting a molar excess of formaldehyde with urea and available commercially under the trade name "Tybon 5711–F"; 2 percent by weight of "Tybon Dark Oil"; and 1 percent by weight of ammonium sulfate catalyst; with the remainder being water.

Instead of coating and/or impregnating the binder formulation onto the glass fibers by spraying, as shown in the accompanying drawing, the glass fiber mat can be impregnated with the binder formulation by any of the conventional coating and/or impregnating techniques known in the art. For example, the binder can be applied by a flow-coating procedure or by immersion of the glass fiber mat into a bath containing the aqueous binder composition. In such cases, the binder formulation is allowed to drain from the glass fiber base; and where rapid drainage is desired, suction means such as suction device 32 can be employed. The binder formulation can be allowed to air dry, but it is preferred to employ heat and suction in conjunction with the drying and curing thereof due to the extended period of time required when using ambient atmospheric curing temperatures.

However, sometimes it is desirable to delay curing, e.g., while the material is stored prior to molding into pipe insulation or other form. For such a purpose the binder composition of this invention displays admirable shelf-life and storeability. For example, glass fiber mats impregnated with the phenol-formaldehyde crystalline urea binder can be removed from forming belt 31 and stored at 50 percent relative humidity and at a temperature of 70° F. for two weeks safely while avoiding self-curing. The binder impregnated articles of this invention can be stored for even longer periods without curing by storage at below room temperature, viz., temperatures ranging from 60° F. to 32° F. and even lower.

The invention will be illustrated further by the examples which follow. These examples are included for purposes of illustrating the invention, and should not be interpreted as limitative with regard to the specific formulations, temperatures, and weight concentrations of the resinous binder as shown therein.

EXAMPLES 1 to 8

Table I

| Ex. | Percent by Wt. of Non-Aqueous Components | | | Percent by Wt. Curing Catalyst (Based on Total Solids Content of Non-Aqueous Portion of Binder) | Grams/Qt. pH Control Agent (Ammonium Hydroxide) | pH |
|---|---|---|---|---|---|---|
| | "A" Stage* Phenol Formaldehyde Condensate | Crystalline Urea | Lubricant and Water Repellent (Tybon Dark Oil) | | | |
| 1 | 99 | 1 | | 2.0 (A) | 10.0 | 8.0 |
| 2 | 95 | 5 | | 2.0 (A) | 10.0 | 8.2 |
| 3 | 90 | 10 | | 2.0 (A) | 10.0 | 8.2 |
| 4 | 80 | 20 | | 2.0 (A) | 10.0 | 8.0 |
| 5 | 70 | 30 | | 2.0 (A) | 10.0 | 8.6 |
| 6 | 68 | 30 | 2 | 2.0 (A) | 6.0 | 8.2 |
| 7 | 65 | 33 | 2 | 2.0 (A) | 6.0 | 8.0 |
| 8 | 64 | 33 | 2 | 1.0 (B) | 6.0 | 8.0 |

| Ex. | Percent by Wt. Solids in Aqueous Binder at Time of Preparation | Binder Stability Overnight at S.T.P. | Color and Glass Adhesion Condition of Binder After Curing for 0.5 Hour at— | | Color and Condition of Binder After Curing and Soaking, Curing for 0.5 Hour at— | |
|---|---|---|---|---|---|---|
| | | | 300° F. | 350° F. | 300° F. | 350° F. |
| 1 | 9.6 | Good | Clear Greenish Tan; Good. | Clear Tan; Good. | No Change | No Change. |
| 2 | 9.8 | ---do--- | ---do--- | ---do--- | ---do--- | Do. |
| 3 | 11.6 | ---do--- | Clear Greenish Yellow; Good. | Clear Greenish Tan; Good. | ---do--- | Do. |
| 4 | 9.9 | ---do--- | Clear Yellow; Good. | Clear Greenish Yellow; Good. | ---do--- | Do. |
| 5 | 9.3 | ---do--- | ---do--- | Clear Yellow; Good. | ---do--- | Released from plate in blister, film still intact. |
| 6 | 9.9 | ---do--- | ---do--- | ---do--- | Released from plate in blisters, film still intact. | Do. |
| 7 | 8.6 | ---do--- | ---do--- | ---do--- | ---do--- | No Change. |
| 8 | 8.6 | ---do--- | ---do--- | ---do--- | ---do--- | Do. |

(A)=ammonium chloride. (B)=ammonium sulfate.
*The "A" stage phenol-formaldehyde condensate employed in Examples 1 to 8 was a commercial "A" stage phenol-formaldehyde condensate prepared by condensing formaldehyde and phenol in a ratio ranging from 1.1 to 2.0:1, and sold under the trade name "N-968" sold by the American Marietta Company.

In Examples 1 to 8 aqueous thermosettable binder compositions were prepared by dissolving the indicated proportion of a commerical "A" stage phenol-formaldehyde condensate into water with vigorous stirring. Then the crystalline urea was added either in granule or pellet form. The lubricant material was thereafter added in the amounts indicated (where applicable) in the various examples. This mixture was then stirred until all of the materials were dissolved therein. Following this the ammonium chloride or ammonium sulfate (curing catalyst) was added in the proportions indicated in the table. The mixture was then stirred to insure uniform distribution of the catalyst in the binder mixture. Then pH control agent (ammonium hydroxide) was added thereto, and the mixture was again stirred to insure uniform distribution of the pH control agent. The pH of the mixture was then noted. The thermosetting reaction mixtures of the various binders were then to stand overnight at standard temperature and pressure and the stability of the respective binder compositions was noted. Samples of each binder solution were then coated onto glass plates six inches by six inches by one quarter inch and placed in an oven for curing at the temperatures indicated. The duration of each cure was 30 minutes. As will be noted from the table above, the clarity of color and the condition of the binder on the glass plates was checked after removal from the curing oven. Following the curing operation, the thus coated samples were soaked in water by submerging the coated plates so that the binder film was completely covered by water for a period of approximately 48 hours. Any changes in the color and condition of the binder after the water soaking were noted and appear in the above table.

Examples 1 to 8 illustrate the binder employed in the present invention at various concentrations of phenol-formaldehyde condensate and monomeric crystalline urea. The pH of the aqueous binder was maintained basic during the preparation thereof since at pH levels significantly below 7.0, e.g., 5.0, the binder is somewhat degraded by physical separation of the phenol-formaldehyde component from the remainder of the aqueous binder composition. In addition, the moisture resistance of the binder composition, once cured, has been noted. In general the moisture resistance of the binder composition is such that no change takes place in the color and condition of the binder after soaking for 48 hours.

No degradation of the cured binder is apparent after soaking. Even though the cured binder film blisters and releases from the flat glass plates in some circumstances, the binder film remains intact as a film. The inclusion of the oily lubricant tends to yield less adhesion to flat glass plates. However, this condition is not objectionable in the primary utility of the present invention, viz., as a binder for glass fiber insulation because the binder is readily retained within the interstices of the glass fiber mat.

Samples were taken of the respective aqueous phenol-formaldehyde urea binder compositions of each of Examples 1 to 8. High density, fine, attenuated glass fiber mat samples were then formed and impregnated with each of binder compositions of Examples 1 to 8, followed by drying and curing of the binders. The cured insulation mat samples, having a density of 5 pounds per cubic foot and a thickness of 2 inches, were then subjected to fire resistance and "punking resistance" tests.

The fire resistance test is conducted on a 36 inch by one inch specimen according to U.S. Military specification Mil–1–742A (1956) paragraphs 4.3.8.1 to 4.3.8.7.

The punking resistance test is conducted using representative half sections of molded pipe insulation specimens having 36 inch length, a 2 inch thickness (inner diameter of 2 inches and outer diameter of 4 inches). The purpose of this test is to determine the extent of punking or combustion propagation of molded pipe insulation after being subjected to spot contact for 10 minutes with a high temperature, ⅛ inch cone blue-bearded laboratory bunsen burner flame. The "punking resistance" test is conducted by placing the half section of pipe insulation convex surface downward in a clamping device allowing free access of the bunsen burner flame for a distance of approximately 7 inches on either end of the specimen. The bunsen burner is then lit and the flame cone adjusted to a height of 4 to 5 inches above the grid of the burner until the blue-bearded flame cones to a steady uniform height of approximately ⅛ inch above the grid of the burner. Then the lighted burner is centered approximately six inches from one end of the specimen with the burner grid approximately 2½ inches below the lower surface of the test specimen. The lighted burner is removed from the igniting position at the end of ten minutes. Then the specimen is unclamped and stood in a vertical position immediately with the ignited end downward, and allowed to remain in this position for 50 minutes. At the end of the 50 minute period, the specimen is cut down the center lengthwise. Then the distance from the non-ignited end to the nearest burned-out point is measured to the nearest $\frac{1}{16}$ inch and recorded. This distance is then subtracted from 30 inches to yield the distance in inches which constitutes the extent of punking or combustion propagation.

The glass fiber products containing the binders of Examples 1 to 8 had good ratings both for fire resistance and punking resistance (approximate average combustion propagation of two inches) when subjected to the above-noted tests.

amples 1–8. The products were then removed from the water and dried to a standard weight at 250° F. After the drying was completed, the moisture resistance was considered satisfactory if no apparent change was evidenced in the thickness or in the resilience of the respective samples. The insulation products of Examples 9–16 were all satisfactory in this regard. The product of Example 9 showed minor delamination whereas those of Examples 10 to 16 had no delamination.

The "Navy Hull Board" products of Examples 9 to 12 were subjected to the Mil–1–742A (paragraphs 4.3.8.2 to 4.3.8.7) fire resistance test noted above in conjunction with Examples 1 to 8. These products were also tested

EXAMPLES 9 to 16

Table II

| Example | Curing Conditions | | Average Diameter of Glass Fibers (Inches) | Wt. Percent of Binder in Dried, Cured Product (Based on Total Wt. of Binder and Fibers) as Determined by Ignition Loss | Density of Insulation (Lbs./Ft.$^3$) | Wall Thickness of Insulation (Inches) |
|---|---|---|---|---|---|---|
| | Temp. (° F.) | Time (Seconds) | | | | |
| 9 (Composition of Ex. 1) | 400 | 330 | 20×10$^{-5}$ | 30 | 2.75 | 1 |
| 10 (Composition of Ex. 2) | 400 | 330 | 20×10$^{-5}$ | 30 | 2.75 | 1 |
| 11 (Composition of Ex. 3) | 400 | 330 | 20×10$^{-5}$ | 30 | 2.75 | 1 |
| 12 (Composition of Ex. 4) | 400 | 330 | 20×10$^{-5}$ | 30 | 2.75 | 1 |
| 13 (Composition of Ex. 5) | 475 | 18 | 20×10$^{-5}$ | 12.5 | 3.5 | 2 |
| 14 (Composition of Ex. 6) | 475 | 18 | 20×10$^{-5}$ | 12.5 | 3.5 | 2 |
| 15 (Composition of Ex. 7) | 475 | 18 | 20×10$^{-5}$ | 12.5 | 3.5 | 2 |
| 16 (Composition of Ex. 8) | 475 | 18 | 20×10$^{-5}$ | 12.5 | 3.5 | 2 |

| Example | Moisture Resistance of Insulation | Resistance to Smoldering (Exs. 9-12) and Punking (Exs. 13-16) | Cutting Properties | Resistance to Fire Test | Form of Insulation Product |
|---|---|---|---|---|---|
| 9 (Composition of Ex. 1) | Average [1] | Slight smoldering | Workable | Failed test by slight margin. | "Navy Hull Board." |
| 10 (Composition of Ex. 2) | Good [2] | No smoldering | Very workable | Fire retardant | Do. |
| 11 (Composition of Ex. 3) | do.[2] | do. | do. | Incombustible | Do. |
| 12 (Composition of Ex. 4) | do.[2] | do. | do. | do. | Do. |
| 13 (Composition of Ex. 5) | do. | 2 inches or less | do. | | Pipe insulation. |
| 14 (Composition of Ex. 6) | do. | do. | do. | | Do. |
| 15 (Composition of Ex. 7) | do. | do. | do. | | Do. |
| 16 (Composition of Ex. 8) | do. | do. | do. | | Do. |

[1] Average indicates some minor delamination.
[2] Good indicates no delamination.

The compositions of Examples 1 to 8 were employed to form the insulation products in Examples 9 to 16, respectively. The compositions employed in Examples 9 to 16 were prepared in the same manner as previously noted with regard to Examples 1 to 8, respectively.

Examples 9 to 12 illustrate the formation of resin-bonded glass fiber insulation products of the "board" type, such as "Navy Hull Board" products, whereas Examples 13 to 16 illustrate pipe insulation products. The glass fibers 12 are drawn from overhead supply 10 and attenuated by gaseous blasts from element 26. The fibers were sprayed with binder and then collected on the upper surface of forming belt 31. In Examples 8 to 12, inclusive, the glass fibers with the binder uniformly distributed therein were then passed between belts 36 and 35 for simultaneous drying and curing.

The impregnated mat was compressed into "board" form by application of pressure by belts 36 and 35. The curing was accomplished at essentially atmospheric pressure. The curing temperatures and time appear in the table above. The average diameter of the glass fibers employed to form the respective "Navy Hull Board" and pipe insulation are noted in the above table.

The pipe insulation products were formed by removing the glass fiber binder impregnated mat from forming belt 31 and molding in a conventional pipe insulation mold into cylindrical pipe 36 inches long and 2 inches thick (inner diameter of 2 inches and outer diameter of 4 inches). Curing of the binder took place in the mold.

The moisture resistance of the samples in the above table was determined by subjecting the samples to the water immersion test noted in conjunction with Examples for resistance to smoldering in accordance with Military Specification Mil–1–742A(1956) paragraph 4.3.7.

The pipe insulation products of Examples 13 to 16 on the other hand were subjected to the punking resistance described above in Examples 1 to 8.

The products of Examples 9 to 16 were also subjected to a cutting (workability) test, Military specification Mil–1–742A(1956) paragraph 3.4.5.

As will be noted from the moisture resistance, "punking" resistance, fire resistance, and cutting properties noted in Table II, the glass fiber insulation products produced according to the present invention can be formed and cured rapidly and possess an overall (composite) balance of highly advantageous properties.

With regard to the crystalline urea, it apparently becomes a part of the resin system of the binder. After drying and curing of the resin-bonded insulation products, they were immersed in water both to determine moisture resistance and also to ascertain whether the urea could be leached out after curing of the resin system. No aqueous leaching of urea was detectable. It can be assumed therefore that the urea actually is chemically bound in the resin perhaps by forming a ternary condensation polymer with the partially condensed phenol-formaldehyde condensate, or perhaps a chemical polyblend of phenol-formaldehyde and urea-formaldehyde cured in part by urea bridges into a three dimensional polymeric network. Of course, applicant is not bound by this or any other theory concerning the chemical reaction(s) occurring in the binder formulation when the binder is cured in situ upon the glass fibers. It should be understood here that the present invention is not necessarily dependent for its operation and advantageous results upon this or any other theory.

The binder composition employed in this invention yields glass fiber insulation products having several advantageous properties not secured by use of a mixture consisting of a previously condensed phenol-formaldehyde resin and a previously prepared urea-formaldehyde resin, which mixture is then cured in situ on the glass fibers. For example, the products of this invention have better moisture resistance and can be cut easier than insulation products using a binder formed by curing a mixture of phenol-formaldehyde and urea-formaldehyde condensates. In addition, even with the curing catalyst present, the binder employed in this invention is more resistant to precuring at ambient atmospheric conditions than phenol-formaldehyde urea-formaldehyde mixed condensates containing a curing catalyst; hence, the instant binder compositions have better shelf life and the glass fiber insulation products impregnated therewith can be stored for a longer period without curing. Also the binder compositions of this invention can be worked (cut) much easier than insulation products containing a binder which consists of a mixture of previously prepared phenol-formaldehyde and melamine-formaldehyde condensates advanced to a cured state.

In practice, insulation products molded and/or bonded with the binder composition described herein are capable of use under elevated temperature conditions without significant "punking" or thermal deterioration; and the cured product is also capable of use under moisture or high humidity conditions without excessive swelling or moisture absorption. Moreover, as noted from Examples 9 to 16, the insulation products prepared according to the present invention display excellent fire and punking resistance and offer good working properties so that they can be readily cut and installed in place on the job site without requiring special, expensive cutting machinery.

While the curing catalyst is usually included in the aqueous binder prior to application thereof onto the attenuated glass fibers, it is also possible to leave the curing catalyst of the initial binder formulation and then apply the curing agent in aqueous solution or dispersion form by a separate impregnation step at a later time.

However, it is most preferable according to the present invention to include the curing agent in the binder when the binder formulation is initially prepared.

It should also be realized that instead of an aqueous system, various organic solvent systems can be employed to serve as an inert carrier and deposit the binder formulation onto the glass fibers. For example, an alcoholic solvent system could be used, viz., wherein ethyl alcohol, n-propyl alcohol, etc., serves as an inert carrier for the binder formulation rather than water. However, the use of water is by far preferred inasmuch as when organic solvent coating and/or impregnating systems are used, there is a fire hazard present due to the evaporation of the solvent material in the glass fiber insulation forming area.

The resin-bonded glass fiber products of the present invention can be used for other purposes than insulation although thermal insulation is by far the foremost commercial utility thereof. For example, the articles of this invention can be used as railroad insulation; upholstery padding for furniture; packing material for shipping purposes; acoustical insulation; and various decorative uses, e.g., Christmas tree ornaments.

While the invention has been illustrated in great detail in the foregoing specification and examples, it should be realized that the invention in its broadest aspects is not necessarily limited to the particular formulations, curing conditions, densities and binder concentrations set forth in the examples.

I claim:

1. A bonded product formed of glass fibers and a heat curable binder securing the fibers together in a comparatively porous structure wherein the heat curable binder comprises the combination of:
    (a) 70 to 100 percent by weight of a polymeric component comprising,
        50 to 99 percent by weight of a phenol-formaldehyde condensate selected from the group consisting of:
            (1) "A" stage phenol-formaldehyde condensates,
            (2) "B" stage phenol-formaldehyde condensates, and
            (3) mixtures of (1) and (2), and 1 to 50 percent by weight of urea;
    (b) 0 to 10 percent by weight of a lubricant material;
    (c) 0 to 10 percent by weight of a curing catalyst;
    (d) 0 to 10 percent by weight of a silane coupling agent; and
    (e) sufficient basic pH control agent to insure maintenance of a basic pH in the binder, and wherein the weight concentration of the said binder in the product ranges from about 2 to about 40 percent by weight based on the combined weight of glass fibers and binder.

2. The bonded product of claim 1 further characterized by a density ranging from 0.125 to 20 pounds per cubic foot.

3. The bonded product of claim 2 wherein the density ranges from 0.25 to 5 pounds per cubic foot.

4. A punking-resistant, fire-resistant, moisture-resistant, readily-workable, bonded glass fiber insulation product which comprises the banded product of claim 1 wherein the binder is advanced to a cured state.

5. The insulation product of claim 4 wherein the average diameter of the glass fibers ranges from $2.0 \times 10^{-5}$ to $1.0 \times 10^{-3}$ inches.

6. A method of preparing a bonded glass fiber product which method comprises the steps of:
    forming glass fibers;
    impregnating the glass fibers with a heat curable binder composition comprising the combination of:
        (a) 70 to 100 percent by weight of a polymeric component comprising,
            50 to 99 percent by weight of a phenol-formaldehyde condensate selected from the group consisting of:
                (1) "A" stage phenol-formaldehyde condensates,
                (2) "B" stage phenol-formaldehyde condensates, and
                (3) mixture of (1) and (2), and 1 to 50 percent by weight of urea;
        (b) 0 to 10 percent by weight of a lubricant material;
        (c) 0 to 10 percent by weight of a curing catalyst;
        (d) 0 to 10 percent by weight of a silane coupling agent; and
        (e) sufficient basic pH control agent to insure maintenance of a basic pH in the binder;
    consolidating the fibers into a loosely packed mat;
    compressing the impregnated glass fibers; and curing the said heat curable binder composition in situ on the glass fibers.

7. The method of claim 6 wherein the said steps of compressing and curing are conducted simultaneously.

8. The method of claim 6 wherein the glass fibers are impregnated prior to consolidating into mat form.

9. The method of claim 6 wherein the average diameter of the glass fibers ranges from $2.0 \times 10^{-5}$ to $1.0 \times 10^{-3}$ inches.

10. The method of claim 6 wherein the curing is accomplished by the application of heat to the impregnated mat at temperatures ranging from 300° F. to 600° F.

11. The method of claim 6 wherein the said binder is applied from an aqueous system.

12. The method of claim 6 wherein the forming step is conducted by first drawing glass from a molten supply through spaced orifices to form primary fibers and then attenuating the primary fibers by contact with a hot gaseous blast.

13. The method of claim 7 wherein the simultaneous compressing and curing is conducted between spaced foraminous belts.

14. A product formed of glass fibers and a heat curable binder securing the fibers together in a comparatively porous structure wherein the heat curable binder comprises the combination of:
  (a) 70 to 100 percent by weight of a polymeric component comprising,
    50 to 99 percent by weight of a phenol-formaldehyde condensate selected from the group consisting of:
      (1) an "A" stage phenol-formaldehyde condensate,
      (2) a "B" stage phenol-formaldehyde condensate, and
      (3) mixtures of (1) and (2), and 1 to 50 percent by weight of urea;
  (b) sufficient catalyst to insure curing of the phenol-formaldehyde condensate; and
  (c) sufficient basic pH control agent to insure maintenance of a basic pH in the binder, and wherein the weight concentration of the said binder in the product ranges from about 2 to about 40 percent by weight based on the combined weight of glass fibers and binder.

15. A method of preparing a bonded glass fiber product which method comprises the steps of:
  forming glass fibers;
  impregnating the glass fibers with a heat curable binder composition comprising the combination of:
    (a) 70 to 100 percent by weight of a polymeric component comprising,
      50 to 99 percent by weight of a phenol-formaldehyde condensate selected from the group consisting of:
        (1) an "A" stage phenol-formaldehyde condensate,
        (2) a "B" stage phenol-formaldehyde condensate, and
        (3) mixtures of (1) and (2), and 1 to 50 percent by weight of urea;
    (b) sufficient catalyst to insure curing of the phenol-formaldehyde condensate; and
    (c) sufficient basic pH control agent to insure maintenance of a basic pH in the binder, and wherein the weight concentration of the said binder in the product ranges from about 2 to about 40 percent by weight based on the combined weight of glass fibers and binder;
  consolidating the fibers into a loosely packed mat;
  compressing the impregnated glass fibers; and curing the said heat curable binder composition in situ on the glass fibers.

References Cited by the Examiner

UNITED STATES PATENTS

| | | | |
|---|---|---|---|
| 1,844,571 | 2/32 | Goldschmidt | 260—45.1 |
| 1,973,050 | 9/34 | Crump | 260—45.1 |
| 2,184,575 | 12/39 | Beutner | 260—45.1 |
| 2,315,400 | 3/43 | D'Alelio | 260—45.1 |
| 2,338,839 | 1/44 | Coss | 154—44.15 |
| 2,604,427 | 7/52 | Armstrong et al. | 154—44.15 X |
| 3,050,427 | 8/62 | Slayter et al. | 156—26 |

ALEXANDER WYMAN, *Primary Examiner.*

MORRIS SUSSMAN, EARL M. BERGERT, *Examiners.*